United States Patent [19]

Narcus et al.

[11] Patent Number: 5,899,058
[45] Date of Patent: May 4, 1999

[54] BYPASS AIR VALVE FOR A GAS TURBINE ENGINE

[75] Inventors: Andrew R. Narcus, Loxahatchee; Douglas A. Hayes, Port Saint Lucie; Thomas A. Auxier, Palm Beach Gardens, all of Fla.

[73] Assignee: United Technologies Corporation, Hartford, Conn.

[21] Appl. No.: 08/859,236

[22] Filed: May 20, 1997

[51] Int. Cl.⁶ .................................................. F02K 3/02
[52] U.S. Cl. ........................... 60/226.3; 60/39.29; 60/262
[58] Field of Search .............................. 60/226.1, 226.3, 60/262, 265, 266, 39.23, 39.29

[56] References Cited

U.S. PATENT DOCUMENTS

| | | | |
|---|---|---|---|
| 4,285,194 | 8/1981 | Nash | 60/261 |
| 4,813,229 | 3/1989 | Simmons | 60/204 |
| 4,958,489 | 9/1990 | Simmons | 60/226.3 |
| 4,961,312 | 10/1990 | Simmons | 60/204 |
| 5,136,840 | 8/1992 | Nash | 60/226.3 |
| 5,182,905 | 2/1993 | Stransky et al. | 60/204 |
| 5,211,007 | 5/1993 | Marvin | 60/204 |
| 5,287,697 | 2/1994 | Johnson et al. | 60/226.3 |
| 5,305,599 | 4/1994 | Marvin | 60/226.3 |
| 5,307,624 | 5/1994 | Even-Nur et al. | 60/262 |
| 5,343,697 | 9/1994 | Johnson et al. | 60/226.3 |
| 5,381,655 | 1/1995 | Orlando et al. | 60/226.3 |
| 5,385,015 | 1/1995 | Clements et al. | 60/261 |
| 5,687,562 | 11/1997 | Stewart et al. | 60/262 |
| 5,775,098 | 7/1998 | Philippona | 60/226.3 |

*Primary Examiner*—Charles G. Freay
*Attorney, Agent, or Firm*—Richard D. Getz

[57] ABSTRACT

A bypass air valve for a gas turbine engine is provided which includes a liner, a strap, and means for selectively actuating the valve. The liner includes an inner radial surface, an outer radial surface, a plurality of first regions, and a plurality of second regions. Each first region includes a plurality of first apertures. Each second region includes a plurality of second apertures. The strap includes a plurality of openings and a plurality of third regions. Each third region includes a plurality of third apertures. The valve may be selectively actuated into an open or a closed position. In the open position, the first regions are substantially aligned with the openings and the third regions are substantially aligned with the second regions. In the closed position, the first regions are substantially aligned with the third regions and the second regions are substantially aligned with the openings.

19 Claims, 5 Drawing Sheets

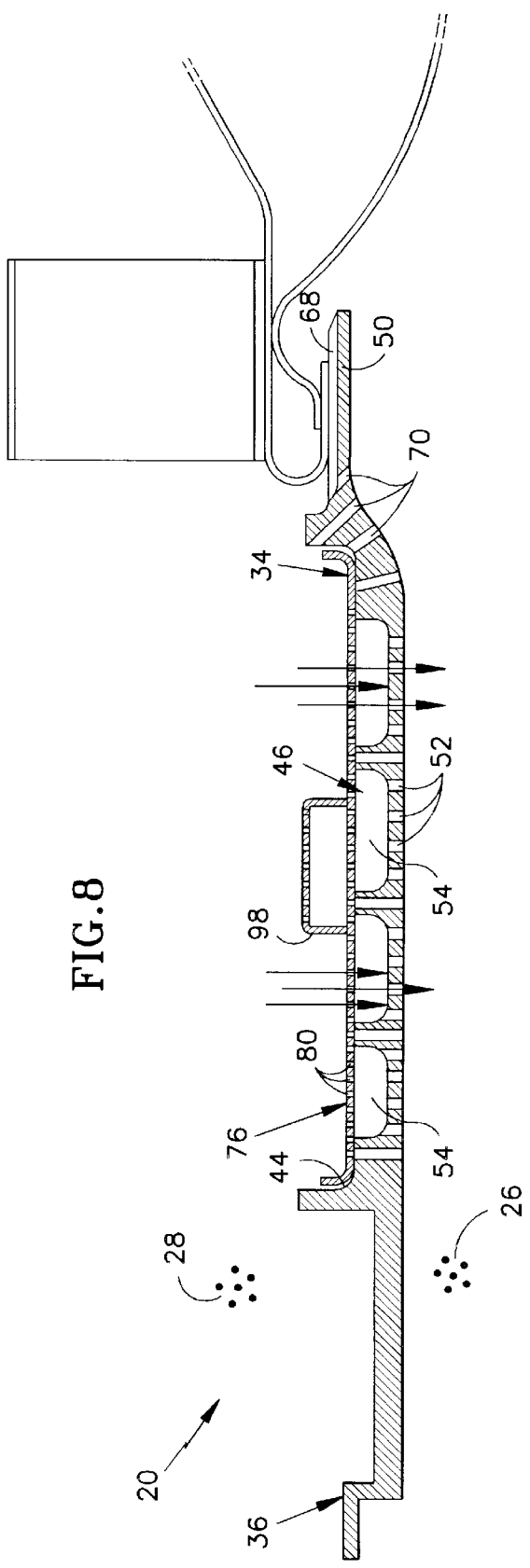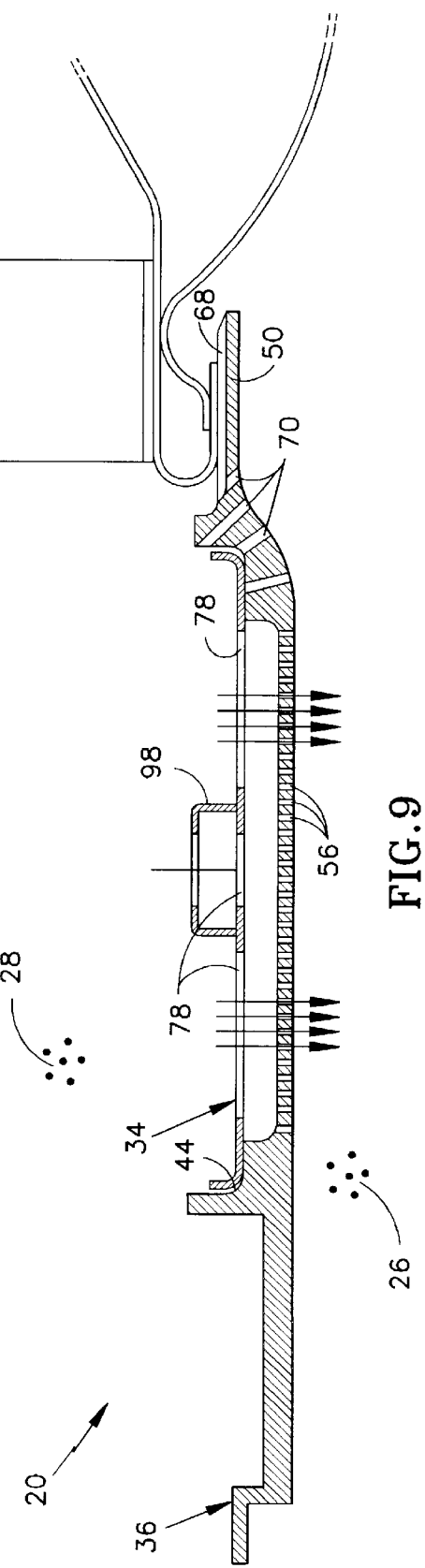

ed with circumferentially spaced exit guide vanes. In other engines, fuel spray bars, flame holding bluff bodies, and ignitors are positioned in the core gas flow path aft of the

BYPASS AIR VALVE FOR A GAS TURBINE ENGINE

The invention was made under a U.S. Government contract and the Government has rights herein.

BACKGROUND OF THE INVENTION

1. Technical Field

This invention applies to gas turbine engines in general, and to bypass air valves in particular.

2. Background Information

Most augmented gas turbine engines include fan, compressor, combustor, turbine, augmentor, and nozzle sections, arranged forward to aft in the engine. Air compressed within the fan and compressor sections travels into the combustor where fuel is added and ignited. The core gas flow (i.e., the air plus the products of combustion) exits the combustor and enters the turbine section, providing power to drive the turbine. The turbine section, in turn, powers the fan and compressor sections. The core gas flow then travels through the augmentor and nozzle, producing thrust to power the aircraft. Under augmented conditions, fuel is selectively added to the core gas flow within the augmentor and combusted to produce additional thrust exiting the nozzle.

The physical operating conditions (e.g., pressure, temperature, and velocity) of the core gas traveling through the engine will vary depending upon the power setting of the engine and the external environment in which the engine is operating. For example, core gas flow traveling through an engine at ground idle will, in most places, be at a lower temperature, pressure, and velocity than the same in an engine under maximum augmentation. The variations in core gas flow operating conditions necessitate cooling mechanisms capable of handling a variety of operating conditions.

To accommodate the spectrum of operating conditions, most augmented gas turbine engines possess the ability to selectively bleed air off of a fan section or a compressor section. The bled air, also referred to as "bypass air", is most often used to cool downstream components such as the combustor, turbine, augmentor, and nozzle, particularly when the engine is operated at high power and/or augmented. Bypass air selectively bled through or passed by structures adjacent the core gas flow path transfers thermal energy away from those structures. Bypass air entering the augmentor also provides additional oxygen for combustion.

The turbine section of the engine generally includes a plurality of stator vanes ("exit guide vanes") disposed aft of the final turbine rotor stage, which extend between an inner radial cone and the outer radial turbine exhaust case. The exit guide vanes orient the flow exiting the turbine rotor stage in an optimum direction for passage through the augmentor and nozzle. The exit guide vanes disposed in the core gas flow path create a flow impediment generally evidenced by a pocket of relatively static core gas (hereinafter referred to as a quiescent pocket) immediately aft of each exit guide vane. The geometry of the quiescent pocket depends upon the geometry of the vane, the vanes orientation relative to the core gas flow, and the velocity of the core gas flow traveling past the vane. In some engines, the exit guide vanes house the augmentor fuel spray bars and an ignition source for igniting the fuel after its introduction into the core gas flow. In those instances, the exit guide vanes are given a geometry that encourages the formation of a quiescent pocket. The flame is initiated and maintained in the quiescent pocket while the core gas flow passes between the circumferentially spaced exit guide vanes. In other engines, fuel spray bars, flame holding bluff bodies, and ignitors are positioned in the core gas flow path aft of the turbine exit guide vanes. An advantage of the using the exit guide vanes as "bluff bodies" to form quiescent pockets is that the need for the downstream fuel spray bars, flame holding bluff bodies, and ignitors is eliminated. A potential disadvantage of the quiescent pockets, however, are the cooling requirements created by high static pressure and temperature within the pockets. An engine having "x" number of turbine exit guide vanes, for example, will have pressure and temperature gradients extending around the circumference of the core gas flow path with "x" number of relative high pressure and temperature zones.

What is needed is a bypass air valve for a gas turbine engine that increases the efficiency of the engine, and one that can operate in an environment having substantial pressure and thermal gradients without adverse consequence.

DISCLOSURE OF THE INVENTION

It is, therefore, an object of the present invention to provide a bypass air valve for a gas turbine engine that increases the efficiency of the engine by minimizing the amount of work lost due to cooling requirements.

Another object of the present invention is to provide a bypass air valve which is resistant to thermal damage.

Another object of the present invention is to provide a bypass air valve that can operate effectively in an environment of substantial pressure and thermal gradients.

According to the present invention, a bypass air valve for a gas turbine engine is provided which includes a liner, a strap, and means for selectively actuating the valve. The liner includes an inner radial surface, an outer radial surface, a plurality of first regions, and a plurality of second regions. Each first region includes a plurality of first apertures. Each second region includes a plurality of second apertures. The strap includes a plurality of openings and a plurality of third regions. Each third region includes a plurality of third apertures. The valve may be selectively actuated into an open or a closed position. In the open position, the first regions are substantially aligned with the openings and the third regions are substantially aligned with the second regions. In the closed position, the first regions are substantially aligned with the third regions and the second regions are substantially aligned with the openings.

An advantage of the present invention is that a means for increasing the efficiency of the engine is provided. Under operating conditions that require either minimal bypass air cooling or minimal pressure bypass air cooling, the present invention bypass air valve can be shifted open and thereby provide a minimal pressure drop path for bypass air to join the lower pressure core gas flow. "Dumping" the bypass air out of the bypass ducting and into the core gas flow path increases the efficiency by decreasing the back pressure within the bypass air ducting. High pressure within the bypass air ducting causes the fan to perform more work which, in turn, causes the turbine driving the fan to perform more work. Ultimately, that work comes from the core gas powering the turbine, thereby leaving less energy available to produce thrust. In addition, bypass air passing through the present invention bypass air valve in the low impedance open position also retains more of the energy imparted to it in either the fan or compressor sections. The conserved energy can be subsequently used downstream to increase the efficiency of the engine.

Another advantage of the present invention is that a bypass air valve is provided which is resistant to thermal damage. A positive flow of bypass air is provided around the entire circumference of the liner in both the open and closed positions, thereby providing cooling adequate to avoid thermal damage. In addition, an embodiment of the present invention provides an aft flange for interfacing with the augmentor liner. The aft flange includes means for cooling which thermally protects the interface between the valve and the augmentor liner.

Another advantage of the present invention is that an environment having substantial pressure and thermal gradients can be accommodated. Core gas flow immediately aft of the turbine is often characterized by circumferential and radial pressure and temperature gradients due to the disposition of the turbine exit guide vanes within the core gas flow. This is particularly true when the engine is operating at a higher power setting, or is under augmentation. The first and second regions of the liner and the openings and third regions of the strap provide bypass air flow paths through the valve that accommodate differences in pressure and temperature.

Another advantage of the present invention is that operating conditions of the fan section can be selectively adjusted. In some instances, it is desirable to alter the amount of resistance experienced by the fan. For example, if the stall margin of an engines fan is critical in certain parts of the flight envelope, the present invention bypass air valve can be opened to decrease back pressure on the fan and increase its stall margin. An open present invention bypass air valve provides less back pressure within the bypass air ducting and therefore less fan resistance, than does a closed present invention bypass air valve.

These and other objects, features, and advantages of the present invention will become apparent in light of the detailed description of the best mode embodiment thereof, as illustrated in the accompanying drawings.

BRIEF DESCRIPTION OF THE DRAWINGS

FIG. 8 is a diagrammatic cross-sectional view of the present invention bypass air valve as shown in FIG. 6, sectioned along line 8—8, also including a forward section of an augmentor liner.

FIG. 9 is a diagrammatic cross-sectional view of the present invention bypass air valve as shown in FIG. 6, sectioned along line 9—9, also including a forward section of an augmentor liner.

BEST MODE FOR CARRYING OUT THE INVENTION

Figure 1:
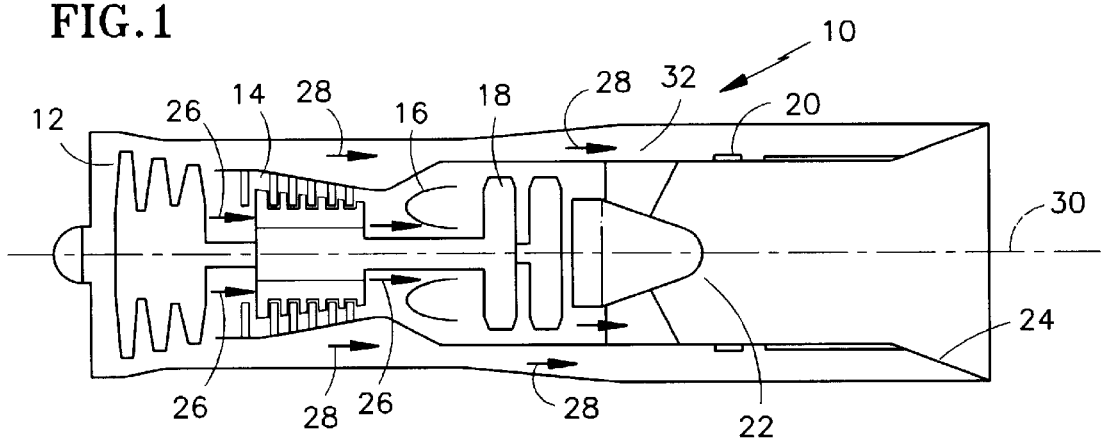
FIG. 1 is a diagrammatic view of a gas turbine engine.

Referring to FIG. 1, a gas turbine engine 10 may be described as having a fan 12, a compressor 14, a combustor 16, a turbine 18, a bypass air valve 20, an augmentor 22, and a nozzle 24. Air exiting the fan 12 is divided between core gas flow 26 and bypass air flow 28. Core gas flow 26 follows a path through the compressor 14, combustor 16, turbine 18, augmentor 22, and nozzle 24 in that order. Core gas flow 26 may, therefore, be described as following a path substantially parallel to the axis 30 of the engine 10. Bypass air 28 also follows a path parallel to the axis 30 of the engine 10, passing through an annulus 32 extending along the periphery of the engine 10. Aft of the compressor 14, bypass air flow 28 is at a higher pressure than core gas flow 26.

I. Elements of the Bypass Air Valve

Figure 2:
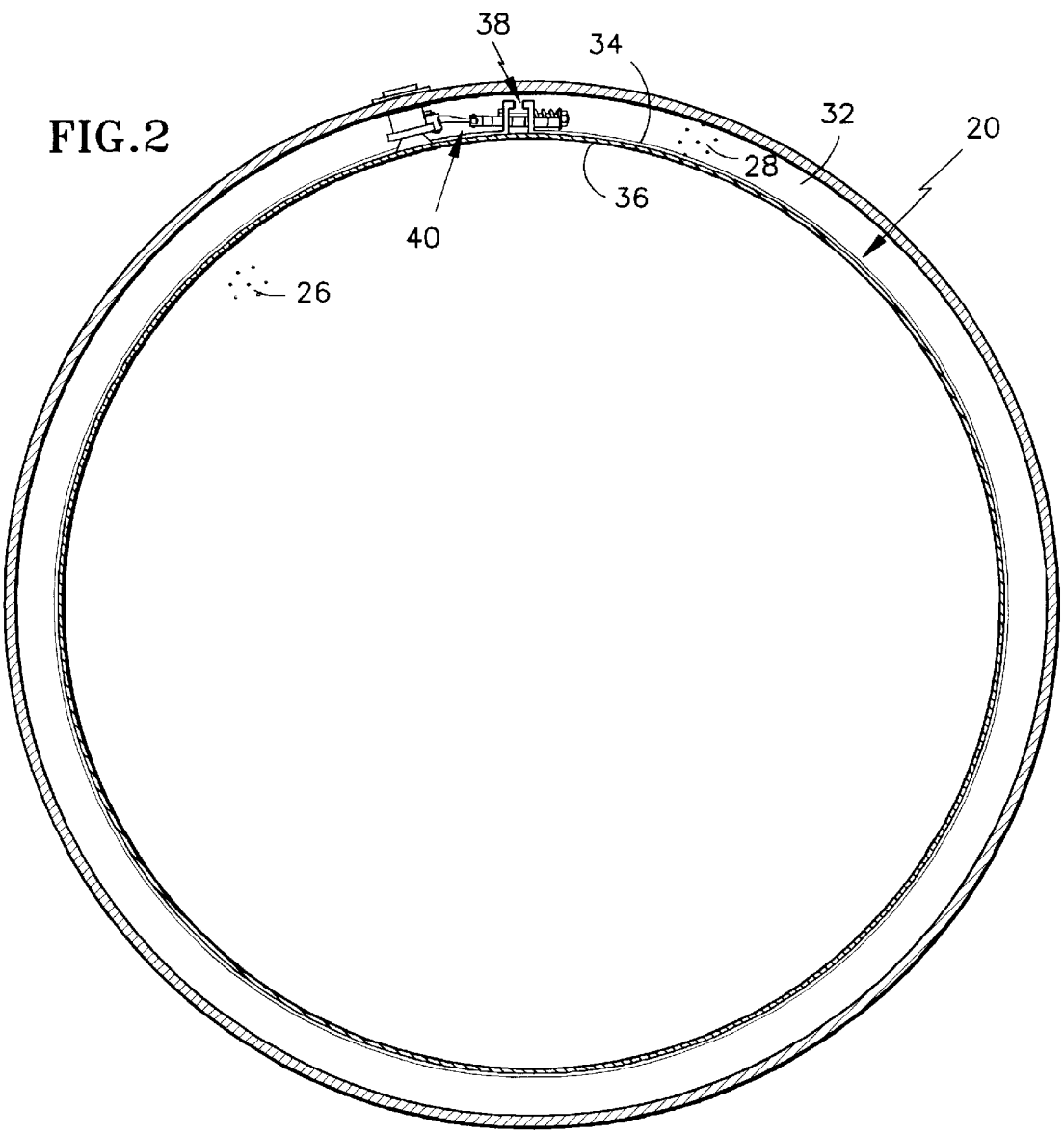
FIG. 2 is a diagrammatic view of the present invention bypass air valve.
Figure 3:
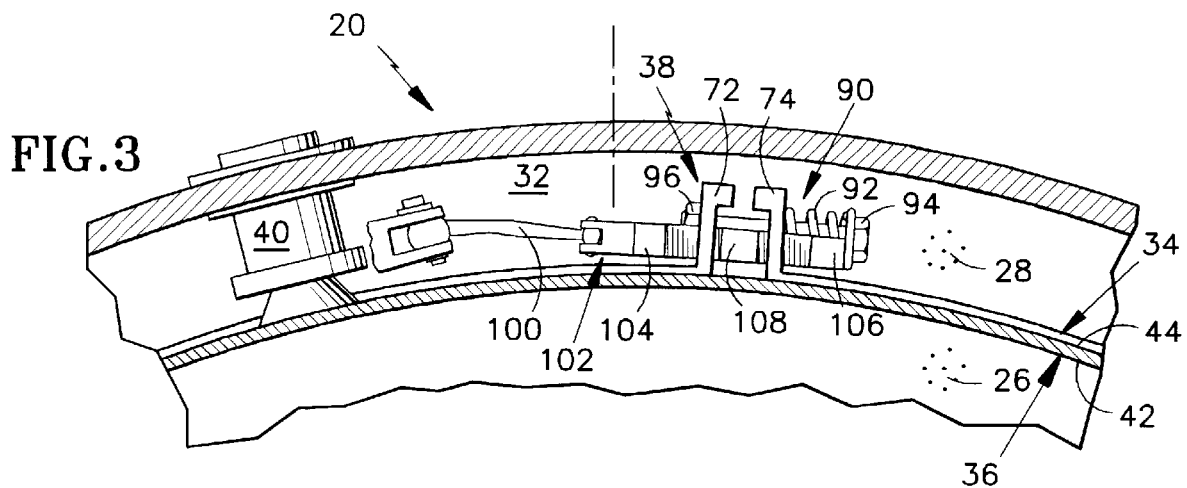
FIG. 3 is an enlarged partial view of the present invention bypass air valve.
Figure 4:
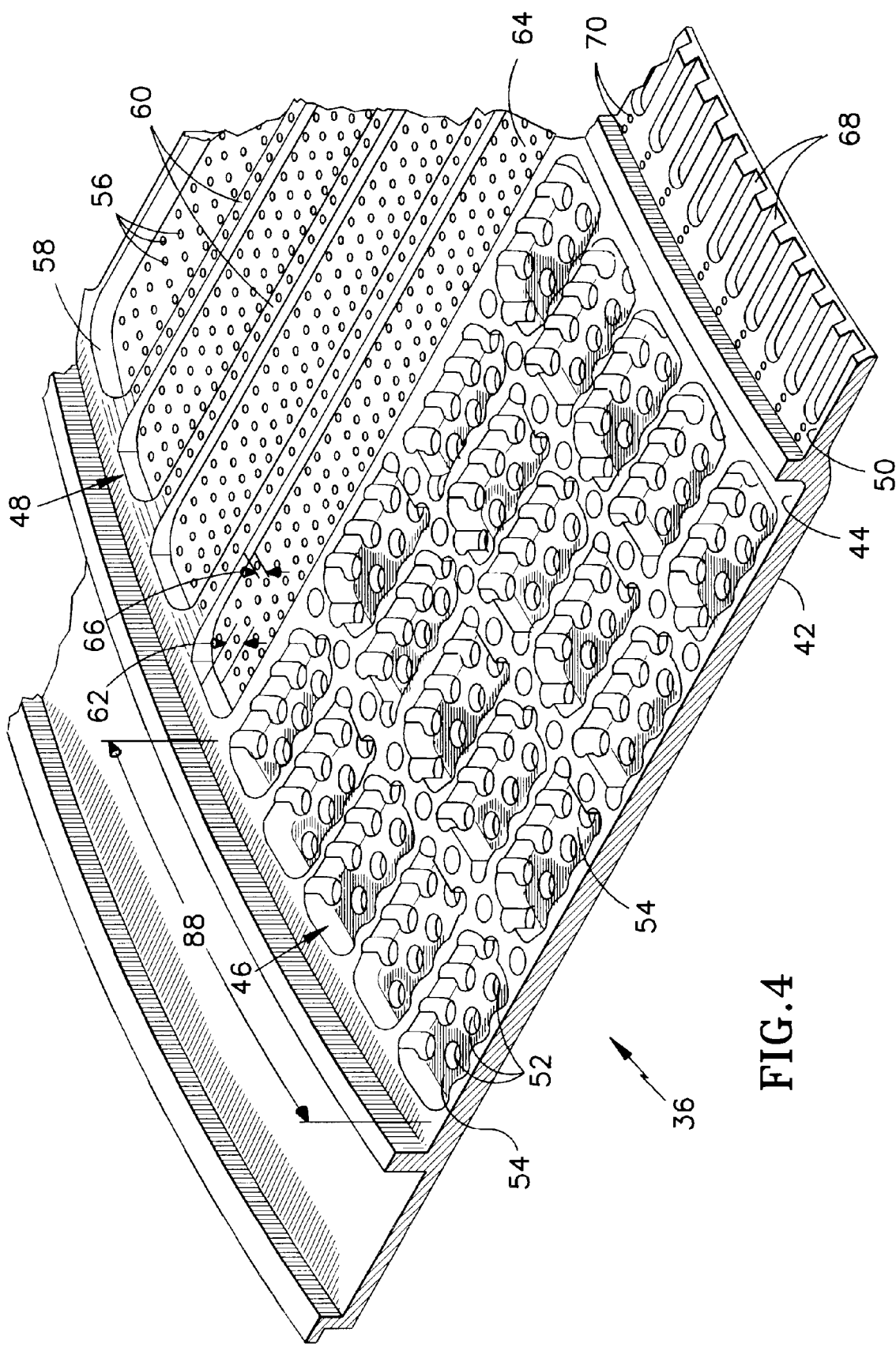
FIG. 4 is a diagrammatic partial perspective view of the liner of the present invention bypass air valve.

FIGS. 2–5 show diagrammatic views of a bypass air valve 20. The bypass air valve 20 is positioned to receive bypass air 28 passing through the annulus 32 (FIG. 2). The bypass air valve 20 includes a strap 34, a liner 36, means 38 for biasing the strap 34 in contact with the liner 36, and an actuator 40 for selectively actuating the strap 34 relative to the liner 36. Referring to FIG. 4, the liner 36 is a ring-like structure which includes an inner radial surface 42, an outer radial surface 44, first regions 46, second regions 48, and an aft flange 50. The first regions 46 include a plurality of first apertures 52. In the preferred embodiment, a plurality of first cavities 54 are disposed in the outer radial surface 44 of each first region 46. The second regions 48 include a plurality of second apertures 56. In the preferred embodiment, the second regions 48 also include a plurality of second cavities 58 disposed in the outer radial surface 44 of the liner 36, separated by ribs 60. The second cavities 58 have a depth 62 extending from the outer radial surface 44 to a base surface 64. The thickness 66 of the ribs 60 is less than the depth 62 of the second cavities 58. The first 46 and second 48 regions in the liner 36 are arranged in a "checkerboard" pattern, where the first 46 and second 48 regions alternate both axially and circumferentially. In the preferred embodiment, the aft flange 50 includes a plurality of cooling slots 68 and cooling apertures 70.

Figure 5:
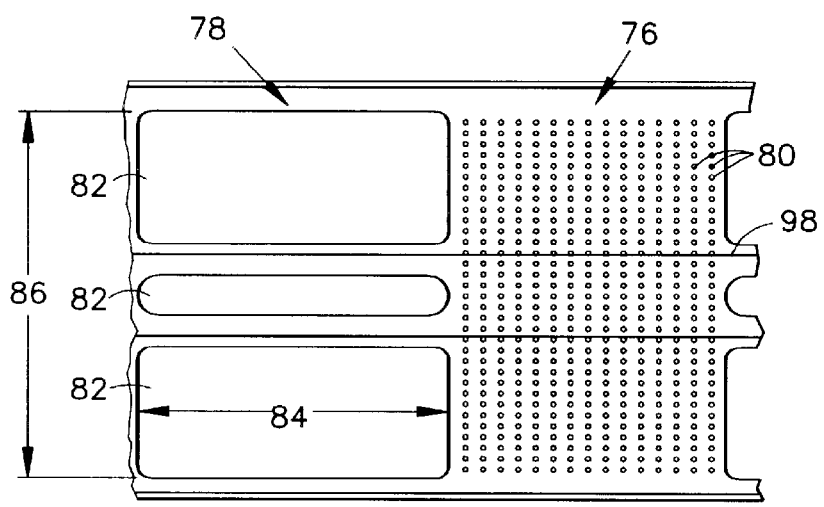
FIG. 5 is a diagrammatic partial radial inward view of the strap of the present invention bypass air valve.

Referring to FIGS. 3 and 5, the strap 34 is formed in a ring and is positioned radially outside the liner 36 for actuation relative to the liner 36. The strap 34 includes a first flange 72 attached to one lengthwise end, a second flange 74 attached to the other lengthwise end (FIG. 3), and a plurality of third regions 76 and openings 78 disposed between the two lengthwise ends (FIG. 5). The third regions 76 include a plurality of third apertures 80 arranged in a pattern complimentary to the pattern of first apertures 52 in the liner first regions 46. The diameter of each third aperture 80 is small relative to each first aperture 52. The relationship between the first 52 and third 80 apertures will be discussed in more detail infra. The openings 78 in the strap 34, as shown in FIG. 5, include three sections 82, although more or less sections may be used alternatively. The collective area of the sections 82, defined by a circumferential width 84 and an axial length 86, take up substantially the same amount of area as the second regions 48 of the liner 36. The circumferential width 84 of the opening sections 82 are greater, however, than the circumferential width 88 (FIG. 7) of the first regions 46. In the preferred embodiment, the third regions 76 and openings 78 in the strap 34 are arranged in a checkerboard pattern, where the third regions 76 and the openings 78 alternate axially and circumferentially. Referring to FIG. 3, the means 38 for biasing the strap 34 in contact with the liner 36 includes a pair of spring assemblies 90. Each spring assembly 90 includes a spring 92, a bolt 94, and a nut 96. The bolt 94 extends through the spring 92 and through clearance holes in the first 72 and second 74 flanges. The spring 92 acts between the bolt\nut assembly 94,96 and the outer surface of one of the flanges 72,74. In the preferred embodiment, the strap 34 includes a structural member 98 (see FIGS. 8 and 9) attached to the side of the strap 34 facing away from the liner 36 to give the strap 34 increased rigidity.

Referring to FIG. 3, the actuator 40 includes a arm 100 and a driver 102. The arm 100 includes a first outer bar 104, a second outer bar 106, and a middle bar 108 disposed between the outer bars 104,106. The first flange 72 of the strap 34 is disposed between the middle bar 108 and the second outer bar 106. The second flange 74 of the strap 34 is disposed between the middle bar 108 and the first outer bar 104. The end of the arm 100 opposite the bars 104,106, 108 is pivotly attached to the driver 102. The driver 102 is rotated by an electromechanical, hydraulic or other type rotation device (not shown).

II. The Bypass Air Valve in the Closed Position

Figure 6:
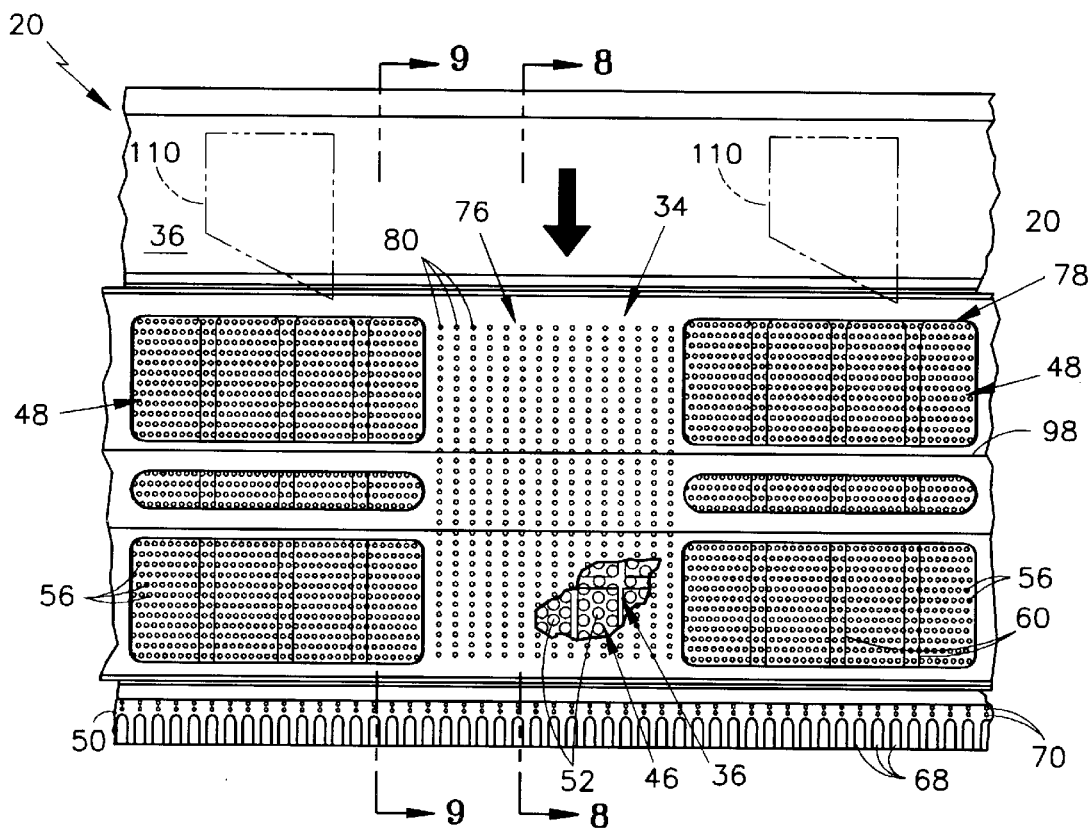
FIG. 6 is a diagrammatic partial radial inward view of the present invention bypass air valve in the closed position.

Referring to FIGS. 6, 8, and 9, the bypass air valve 20 is normally closed under those conditions (high power settings, augmentation, etc.) where a high level of cooling is required aft of the bypass air valve 20, in the augmentor 22 and nozzle 24 (FIG. 1). In the closed position, the strap 34 is actuated to a position where the openings 78 in the strap 34 are substantially aligned with the second regions 48 of the liner 36 and the third regions 76 of the strap 34 are substantially aligned with the first regions 46 of the liner 36. The patterns of first apertures 52 and the third apertures 80 align such that bypass air 28 traveling through some of the third apertures 80 impinges the liner 36 between first apertures 52. Bypass air 28 traveling through the remaining third apertures 80 is directed toward aligned first apertures 52 (FIG. 8).

The pressure drop across the bypass air valve 20 (i.e., the difference in pressure between the bypass air and the core gas) is discretely stepped across the valve 20. The number of steps and the magnitude of each step is defined by the path through the bypass air valve 20. For example, the alignment between the first 46 and third 76 regions in the closed position creates two discrete steps across the bypass air valve 20; one step across the strap 34 and one step across the liner 36 which together equal the pressure drop across the bypass air valve 20. The smaller third apertures 80 support a much larger pressure drop than do the relatively large first apertures 52. As a result, bypass air flow 28 impinges against the liner 36 between first apertures 52 or passes through aligned first apertures 52. After impinging on the liner 36, bypass air 28 travels through the first apertures 52 and "bleeds" out into the core gas flow 26. The low pressure bleeding of the bypass air 28 from the first apertures 52 facilitates the formation of a boundary layer (not shown) along the inner radial surface 42 of the liner. The boundary layer of relatively cool bypass air 28 helps to thermally protect the liner 36 from the hot core gas flow 26. The difference in diameter (or cross-sectional area if not round) between the first 52 and third 80 apertures may be increased or decreased to alter the magnitude of the pressure steps across the strap 34 and liner 36.

Referring to FIG. 6, in the embodiment having first cavities 54 disposed in the outer radial surface 44 of the liner 36, the first cavities 54 compartmentalize bypass air 28 traveling between the strap 34 and the liner 36. Bypass air 28 entering a first cavity 54 through one or more third apertures 80 must exit the first apertures 52 aligned with that particular first cavity 54. As a result, the first apertures 52 have a positive flow of bypass air 28 exiting them despite having only a slight difference in pressure across them. The positive air flow through the first apertures 52 is particularly important in areas where substantial pressure gradients exist and local core gas pressure may exceed the pressure of a first cavity 54 at a particular point in time. In that instance, bypass air 28 will continue to enter the first cavity 54 by virtue of the relatively large pressure difference across the strap 34, eventually increasing in pressure until the pressure within the first cavity 54 exceeds the local pressure within the core gas flow 28. Hence, hot gas influx and potential thermal damage are avoided.

Referring to FIG. 6, bypass air traveling through the "closed" bypass air valve 20 via the openings 78 in the strap 34 and the second apertures 56 in the second regions 48 is subject to a single discrete pressure drop. The openings 78 provide a negligible pressure drop, thereby leaving the pressure drop across the second apertures 56 substantially equal to the pressure drop across the bypass air valve 20. The second apertures 56 are sized to cause the bypass air 28 to "jet" into the core gas flow 26. In the preferred embodiment, each second region 48 is positioned aft of a turbine exit guide vane 110 (shown in phantom in FIGS. 8 and 9), such that bypass air 28 "jetting" out from the second regions 48 enters into the high pressure, high temperature quiescent pocket created in the bypass air 28 aft of the turbine exit guide vane 110. Bypass air 28 "jetting" into the quiescent pocket thermally protects the liner 36 by blowing the high temperature core gas 26 away from the liner 36 and preventing undesirable high temperature core gas influx. In those instances where augmentor fuel is distributed adjacent the turbine exit guide vanes 110, blowing the bypass air 28 and fuel mixture away from the liner 36 is particularly important, since combustion adjacent the liner 36 increases the opportunity for thermal damage.

III. Actuating the Valve Toward the Open or Closed Position

Referring to FIG. 3, when the bypass air valve 20 is actuated toward the open position, the actuator driver 102 drives the arm 100 in a direction substantially tangential to the circumference of the liner 36. As a result, the middle bar 108 contacts the first flange 72 and drives a segment of the strap 34 out of contact with the liner 36. After the strap segment has been disengaged from the liner 36, the strap 34 will be translated by either the spring assemblies 90 drawing the second flange 74 in the same direction, or by the first outer bar 104 contacting the second flange 74. After the strap 34 is translated to the open position, the spring assemblies 90 and the pressure against the strap 34 will bias the strap 34 against the liner 36.

When the bypass air valve 20 is actuated toward the closed position, the driver 102 drives the arm 100 in a direction opposite that taken to open the valve 20. In doing so, the middle bar 108 contacts the second flange 74 and drives a segment of the strap 34 out of contact with the liner 36. The strap 34 is subsequently translated by either the spring assemblies 90 drawing the first flange 72 in the same direction, or by the second outer bar 106 contacting the first flange 72. After the strap 34 is translated to the open position, the spring assemblies 90 and the pressure against the strap 34 bias the strap 34 against the liner 36.

IV. The Bypass Air Valve in the Open Position

Figure 7:
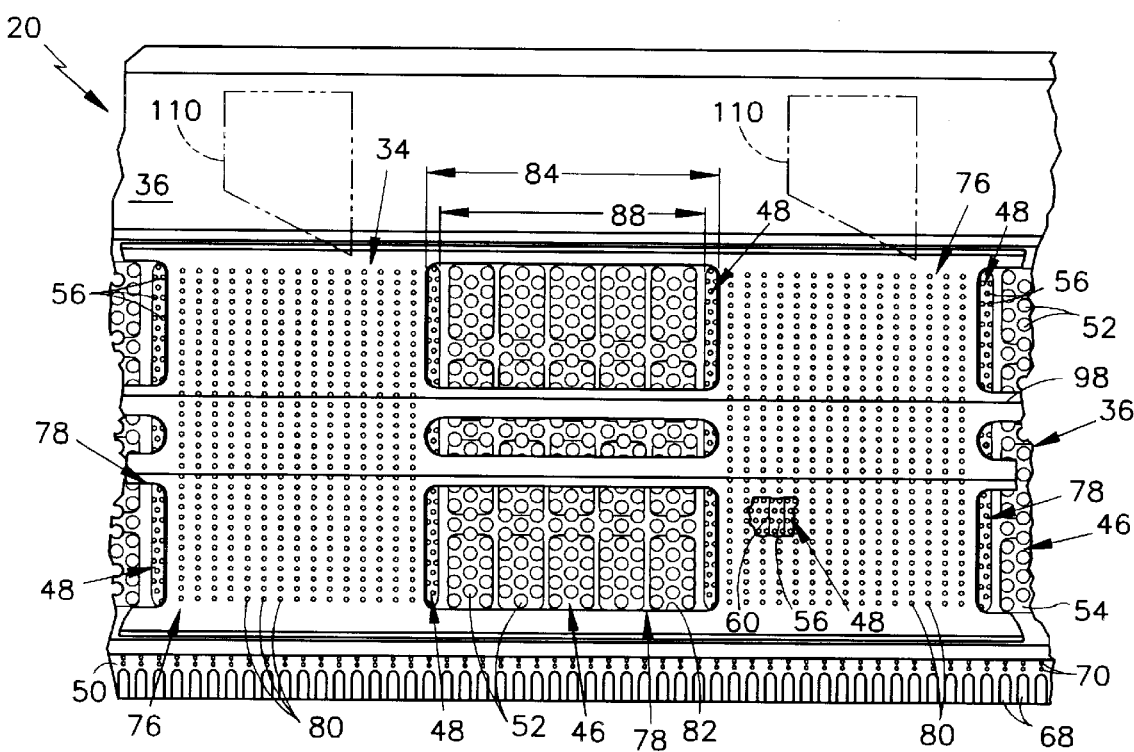
FIG. 7 is a diagrammatic partial radial inward view of the present invention bypass air valve in the open position.

Referring to FIG. 7, the bypass air valve 20 is normally open under those conditions (lower power settings, no augmentation, etc.) where a lower level of cooling is required aft of the bypass air valve 20, in the augmentor 22 and nozzle 24 (FIG. 1). Alternatively, it may be desirable to have the present bypass air valve 20 open for purposes of selectively adjusting the operating conditions of the fan. In the open position, the openings 78 in the strap 34 are substantially aligned with the first regions 46 in the liner 36, and the third regions 76 in the strap 34 are aligned with the second regions 48 in the liner 36. The openings 78 allow a large volume of bypass air 28 to travel directly through the first apertures 52 and into the core gas flow 26 with minimal pressure drop. Bypass air 28 also travels into the core gas flow 26 via the second apertures 56. Bypass air 28 accesses the second apertures 56 by traveling through third apertures 80 or the openings 78. The circumferential width 84 of the openings 78 overlaps each first region 46, extending a distance into each adjacent second region 48. The overlap of the openings 78 into the second regions 48 provides a minimal pressure drop path to the second apertures 56. In the embodiment where each second region 48 includes a plurality of second cavities 58 separated by ribs 60, the gap between each rib 60 and the strap 34 allows bypass air 28 to travel between adjacent second cavities 58. The gap between each rib 60 and the strap 36 exists because the thickness 66 of each rib 60 is less than the depth 62 of the second cavities 58.

Regardless of whether the bypass air valve 20 is opened or closed, bypass air 28 traveling through the valve 20 will enter the core gas flow 28 around the entire circumference of the bypass air valve 20. The circumferential uniformity of the bypass air 28 entering the augmentor 22 increases the efficiency of the augmentor 22 and minimizes the effects of any pressure and thermal gradients that may exist. In addition, the slots 68 and cooling apertures 70 in the aft flange 50 permit bypass air 28 to travel through or adjacent the aft flange 50 with the bypass air valve 20 opened or closed. The number and position of the slots 68 in the aft flange 50 can be varied to accommodate different cooling requirements.

Although this invention has been shown and described with respect to the detailed embodiments thereof, it will be understood by those skilled in the art that various changes in form and detail thereof may be made without departing from the spirit and the scope of the invention. For example, the preferred arrangement of first 46 and second regions 48 within the liner 36, and the third regions 76 and openings 78 within the strap 34, are given as a checkerboard pattern. Other patterns may be used alternatively. In addition, the actuator 40 is described as having an arm 100 and a driver 102. Other means for actuating the strap 34 relative to the liner 36 may be used alternately.

We claim:

1. A bypass air valve for a turbofan gas turbine engine, comprising:
    a liner, having an inner radial surface, an outer radial surface, a plurality of first regions, each first region including a plurality of first apertures, and a plurality of second regions, each second region having a plurality of second apertures;
    a strap, surrounding said liner, said strap having a plurality of openings and a plurality of third regions, said third regions including a plurality of third apertures;
    an actuator, for selectively actuating said strap relative to said liner;
    wherein said valve may be selectively actuated into an open position where said first regions are substantially aligned with said openings, thereby providing a first flow path for bypass air through said valve via said openings and said first apertures, and said third regions are substantially aligned with said second regions thereby providing a second flow path for bypass air through said valve via said third apertures and said second apertures; and
    wherein said valve may be selectively actuated into a closed position where said first regions are substantially aligned with said third regions, thereby providing a third flow path through said valve via said third and first apertures, and said second regions are substantially aligned with said openings, thereby providing a fourth flow path through said valve via said openings and said second apertures.

2. A bypass air valve according to claim 1, wherein said third flow path through said third and first apertures is sized to impede bypass air flow substantially more than said first flow path through said openings and said first apertures.

3. A bypass air valve according to claim 2, wherein said first regions further comprise:
    a plurality of first cavities, disposed within said outer surface, wherein at least one of said first apertures extend through each said first cavity.

4. A bypass air valve according to claim 3, wherein said liner further comprises an aft flange.

5. A bypass air valve according to claim 4, wherein said aft flange comprises cooling means.

6. A bypass air valve according to claim 5, wherein said cooling means comprises a plurality of slots disposed in an outer radial surface of said aft flange; and
    wherein said liner further comprises a plurality of fourth apertures adjacent said aft flange.

7. A bypass air valve according to claim 5, wherein said second regions further comprise:
    a plurality of second cavities, disposed in said outer radial surface of said liner, said second cavities separated from one another by a rib.

8. A bypass air valve according to claim 7, wherein in said open position, said openings in said strap substantially aligned with one of first regions overlap said adjacent second regions, thereby allowing bypass air to enter said second cavities via said openings.

9. A bypass air valve according to claim 3, wherein said second regions further comprise:
    a plurality of second cavities, disposed in said outer radial surface of said liner, said second cavities separated from one another by a rib.

10. A bypass air valve according to claim 9, wherein in said open position, said openings overlap said adjacent second regions, thereby allowing bypass air to enter said second cavities via said openings.

11. A bypass air valve according to claim 3, wherein said third apertures are arranged in parallel rows, and said first apertures are arranged in parallel rows;
    wherein said rows of first and third apertures are relatively spaced such that in said closed position one of said rows of third apertures substantially aligns with one of said rows of first apertures, and one of said rows of third apertures is disposed between adjacent said rows of first apertures.

12. A bypass air valve according to claim 11, wherein said first and second regions are disposed alternately about the circumference of said liner.

13. A bypass air valve according to claim 12, wherein said openings and said third regions are disposed alternately about the circumference of said strap.

14. A bypass air valve according to claim 13, wherein first apertures are larger in diameter than said second apertures.

15. A bypass air valve according to claim 2, wherein said first and second regions are disposed alternately about the circumference of said liner.

16. A bypass air valve according to claim 15, wherein said openings and said third regions are disposed alternately about the circumference of said strap.

17. A bypass air valve according to claim 2, wherein said liner further comprises an aft flange.

18. A bypass air valve according to claim 17, wherein said aft flange comprises cooling means.

19. A bypass air valve according to claim 18, wherein said cooling means comprises a plurality of slots disposed in an outer radial surface of said aft flange; and wherein said liner further comprises a plurality of fourth apertures adjacent said aft flange.

* * * * *